(12) United States Patent
Ishikawa et al.

(10) Patent No.: US 8,047,080 B2
(45) Date of Patent: Nov. 1, 2011

(54) ELECTROMAGNETIC FLOWMETER AND ZERO POINT MEASUREMENT METHOD THEREOF

(75) Inventors: Ikuhiko Ishikawa, Musashino (JP); Yasumi Koike, Musashino (JP); Toru Shimura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 542 days.

(21) Appl. No.: 12/075,172

(22) Filed: Mar. 10, 2008

(65) Prior Publication Data

US 2008/0282766 A1    Nov. 20, 2008

(30) Foreign Application Priority Data

Mar. 13, 2007    (JP) .................................. 2007-062942

(51) Int. Cl.
*G01F 1/54*    (2006.01)
(52) U.S. Cl. ...................................... 73/861.12; 73/1.34
(58) Field of Classification Search .................... 73/1.34, 73/861.12, 861.17
See application file for complete search history.

(56) References Cited

U.S. PATENT DOCUMENTS

| | | | | |
|---|---|---|---|---|
| 4,210,022 | A * | 7/1980 | Boss ........................... | 73/861.17 |
| 4,601,209 | A * | 7/1986 | Amata ......................... | 73/861.17 |
| 4,676,112 | A | 6/1987 | Uematsu et al. | |
| 4,709,583 | A * | 12/1987 | De Paepe et al. ........... | 73/861.17 |
| 4,773,274 | A * | 9/1988 | Kobayashi et al. ......... | 73/861.16 |
| 5,090,250 | A * | 2/1992 | Wada .......................... | 73/861.12 |
| 5,299,544 | A * | 4/1994 | Kitamoto et al. ............ | 123/520 |
| 5,402,685 | A | 4/1995 | Brobeil | |
| 6,557,422 | B1 * | 5/2003 | Kolahi ...................... | 73/861.357 |
| 2003/0005778 | A1 * | 1/2003 | Budmiger .................. | 73/861.17 |

FOREIGN PATENT DOCUMENTS

| | | |
|---|---|---|
| DE | 10 2005 033 290 A1 | 1/2007 |
| JP | 61-95213 A | 5/1986 |
| JP | 2002-340638 | 11/2002 |

OTHER PUBLICATIONS

Extended European search report issued in counterpart European Application No. 08004497.7 dated Dec. 21, 2009.

* cited by examiner

*Primary Examiner* — Hezron E Williams
*Assistant Examiner* — Nashmiya Fayyaz
(74) *Attorney, Agent, or Firm* — Sughrue Mion, PLLC (57) ABSTRACT

An electromagnetic flowmeter for giving a magnetic field to a measurement fluid, detecting an electric signal occurring in the measurement fluid according to the magnetic field, and computing a flow quantity value based on the electric signal includes a zero point measurement section for measuring a zero point of the measurement fluid; a storage section for storing the measured zero point measurement value; a determination section for determining whether or not the difference between the preceding zero point measurement value stored in the storage section and the present zero point measurement value is beyond a predetermined value range; and at least either a transmission section for transmitting the determination result or a display section for displaying the determination result when the determination section determines that the difference is beyond the predetermined value range.

5 Claims, 11 Drawing Sheets

| SIGNAL PATTERN | PRODUCED MAGNETIC FIELD | Q1 AND Q4 | Q2 AND Q3 |
|---|---|---|---|
| A | FORWARD EXCITATION | ON | OFF |
| B | BACKWARD EXCITATION | OFF | ON |
| C | NO MAGNETIC FIELD | OFF | OFF |

FIG. 6B

| TO BE CHANGED | WHEN OUTPUT CURRENT IS SMALL | WHEN OUTPUT CURRENT IS LARGE | EXECUTION METHOD |
|---|---|---|---|
| EXCITATION METHOD | THREE-VALUED EXCITATION | TWO-FREQUENCY EXCITATION OR TWO-VALUED EXCITATION | SIGNAL PATTERN CHANGE OF TIMING SIGNALS L6 TO L9 |
| EXCITATION CURRENT VALUE | SMALL | LARGE | DUTY CHANGE OF EXCITATION PWM SIGNAL L10 |

ELECTROMAGNETIC FLOWMETER AND ZERO POINT MEASUREMENT METHOD THEREOF

This application claims priority to Japanese Patent Application No. 2007-062942, filed Mar. 13, 2007, in the Japanese Patent Office. The priority application is incorporated by reference in its entirety.

TECHNICAL FIELD

The present disclosure relates to a zero point measurement of a measurement fluid in the electromagnetic flowmeter. More specifically, the present disclosure relates to an electromagnetic flowmeter for performing zero point measurement without changing the output current of the electromagnetic flowmeter if the difference between the flow quantity value when a measurement fluid is made still and the preceding zero point measurement value is within a predetermined value range.

RELATED ART

The electromagnetic flowmeter gives a magnetic field to a measurement fluid flowing through a tube of a detector, detects an electric signal produced in the measurement fluid by the magnetic field, and computes and outputs the flow quantity of the measurement fluid based on the electric signal. The flow quantity value computed in a state in which the measurement fluid is made still is measured as a zero point measurement value and zero point correction computation of subtracting the zero point measurement value from the computed flow quantity value is performed to remove an error caused by the zero point measurement value in flow quantity measurement in a usual state. At this time, to execute the zero point measurement, the output current value, the excitation current value, and the excitation system of the electromagnetic flowmeter are changed. Such an electromagnetic flowmeter will be discussed with FIG. 11.

Figure 11:
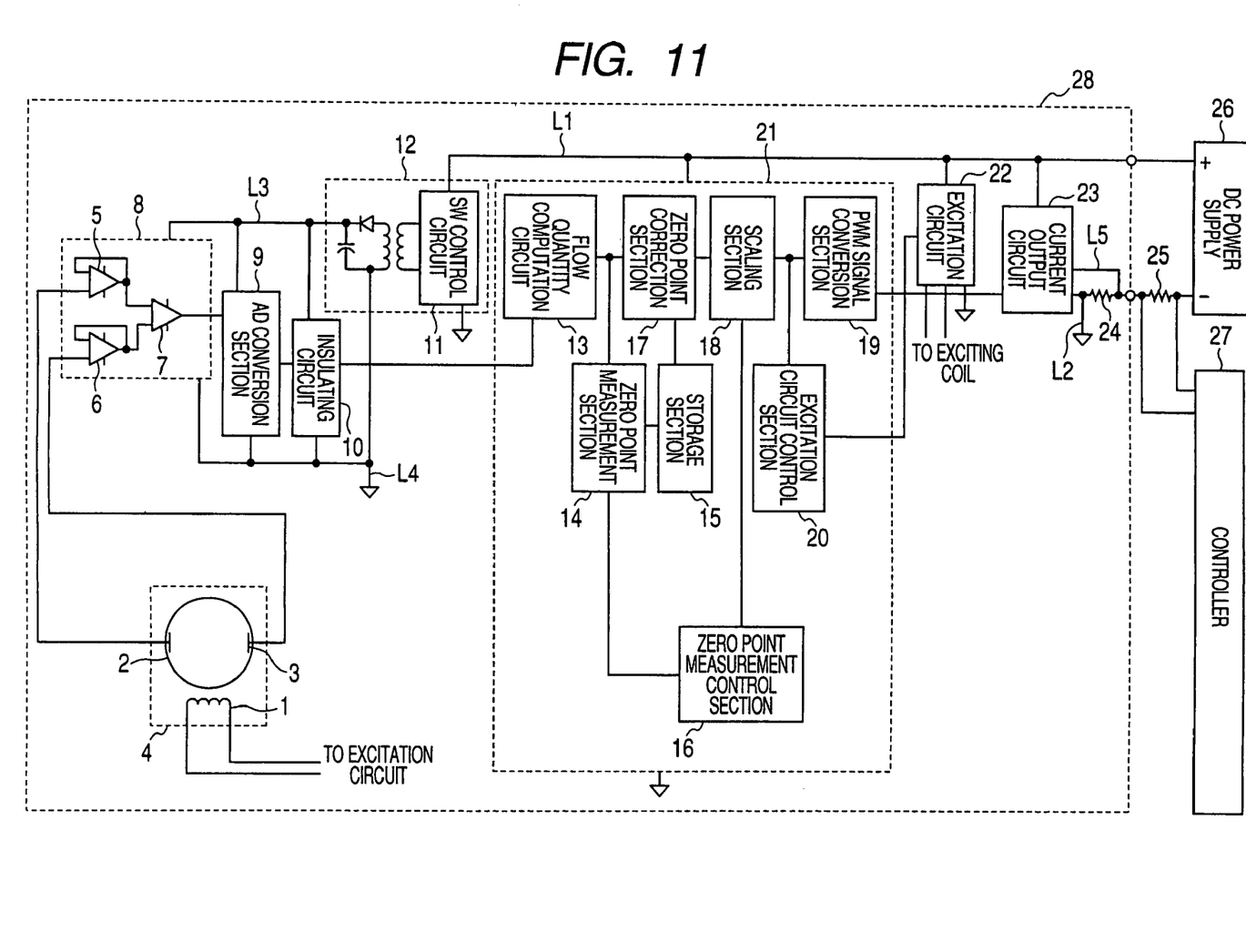
FIG. 11 is a block diagram of an electromagnetic flowmeter in a related art.

An electromagnetic flowmeter 28 is made up of a detector 4, an amplification circuit 8, an AD conversion section 9, an insulating circuit 10, a DC-DC conversion circuit 12, a computation control section 21, an excitation circuit 22, a current output circuit 23, etc.

One of a pair of output terminals of the electromagnetic flowmeter 28 is connected to a positive terminal (+) of a DC power supply 26 and the other output terminal is connected to a negative terminal (−) of the DC power supply 26 through a resistor 25. The DC power supply 26 supplies a current (for example, ranging from 4 to 20 milliamperes) corresponding to the computed flow quantity value and DC voltage to the electromagnetic flowmeter 28. A controller 27 connected to both ends of the resistor 25 measures a current output from the electromagnetic flowmeter 28 through the resistor 25, converts the measurement value into a flow quantity value, and performs process control (for example, flow control).

The output terminal connected to the positive terminal (+) of the DC power supply 26 is connected to a first power supply line L1. Power supply terminals of the computation control section 21, the excitation circuit 22, the current output circuit 23, and the input side (SW control circuit 11) of the DC-DC conversion circuit 12 are connected to the first power supply line L1.

A connection part of the current output circuit 23 and an output current detection resistor 24 is connected to a first common line L2. Common (reference potential) terminals of the computation control section 21, the excitation circuit 22, the current output circuit 23, and the input side (SW control circuit 11) of the DC-DC conversion circuit 12 are connected to the first common line L2. The computation control section 21, the excitation circuit 22, the current output circuit 23, and the DC-DC conversion circuit 12 receive power supply from the first power supply line L1.

A power supply terminal of the output side of the DC-DC conversion circuit 12 is connected to a second power supply line L3. Power supply terminals of the amplification circuit 8, the AD conversion section 9, and the insulating circuit 10 are connected to the second power supply line L3.

A common (reference potential) terminal of the output side of the DC-DC conversion circuit 12 is connected to a second common line L4. Common (reference potential) terminals of the amplification circuit 8, the AD conversion section 9, and the insulating circuit 10 are connected to the second common line L4. The amplification circuit 8, the AD conversion section 9, and the insulating circuit 10 receive power supply from the output of the DC-DC conversion circuit 12 (the second power supply line L3).

The excitation circuit 22 is connected to an excitation circuit control section 20 and an exciting coil 1. The excitation circuit 22 causes an excitation current to flow into the exciting coil 1 based on a control signal of the excitation circuit control section 20. The exciting coil 1 generates a magnetic field in a tube of the detector 4 and gives the magnetic field to a measurement fluid in the tube, whereby an electric signal (electromotive force) proportional to the magnetic flux density of the magnetic field and the flow velocity of the measurement fluid occurs in the measurement fluid flowing through the tube. The detector 4 is made up of the exciting coil 1, electrodes 2 and 3, the tube for allowing a measurement fluid to flow (not shown), etc., and the electric signal is detected by the electrodes 2 and 3 placed in the tube.

The amplification circuit 8 is made up of buffers (voltage followers) 5 and 6 and a differential amplifier 7. Inputs of the buffers 5 and 6 are connected to the electrodes 2 and 3 and outputs of the buffers 5 and 6 are connected to input of the differential amplifier 7. The amplification circuit 8 generates a difference signal between the electric signals detected by the electrodes 2 and 3 and outputs the difference signal to the AD conversion section 9. The difference signal is proportional to the flow velocity of the measurement fluid.

The AD conversion section 9 converts the analog difference signal into digital data and outputs the digital data to a flow quantity computation section 13 through the isolation circuit 10. The insulating circuit 10 has an interface function for executing signal conversion so that a signal can be transferred between circuits different in reference potential (first common line L2 and second common line L4).

The DC-DC conversion circuit 12 is an insulation-type DC voltage conversion circuit of an inverter system. It converts DC voltage of the first power supply line L1 into AC voltage by the SW control circuit 11 and steps up or down the voltage with a transformer and then rectifies the voltage by a diode and a capacitor and converts the voltage into DC voltage of the second power supply line L3. Accordingly, the circuits connected to the first power supply line L1 and the first common line L2 are electrically insulated from the circuits connected to the second power supply line L3 and the second common line L4.

The computation control section 21 is made up of the above-mentioned flow quantity computation section 13, a zero point measurement section 14, a storage section 15, a zero point measurement control section 16, a zero point correction section 17, a scaling section 18, a PWM signal conversion section 19, and the above-mentioned excitation circuit control section 20 and performs operation control and signal processing of the electromagnetic flowmeter 28.

The flow quantity computation section 13 performs operation such as multiplying the digital data of the difference signal proportional to the flow velocity of the measurement fluid received from the isolation circuit 10 by the inner diameter in the tube of the detector 4 and computes the flow quantity value of the measurement fluid. The zero point measurement section 14 acquires the flow quantity value in a state in which the measurement fluid is made still (which will be hereinafter referred to as "zero point measurement value") from the flow quantity computation section 13 and stores the zero point measurement value in the storage section 15.

To remove an error caused by the zero point measurement value, the zero point correction section 17 subtracts the zero point measurement value stored in the storage section 15 from the flow quantity value computed in the flow quantity computation section 13 to compute the flow quantity value subjected to zero point correction.

The scaling section 18 receives the flow quantity value subjected to zero point correction and scales (normalizes) the value relative to a predetermined flow quantity value (for example, in the range of 0 to 1). The PWM signal conversion section 19 receives the scaled value and outputs a PWM signal (pulse width modulation signal) having a duty to output a current proportional to the value (for example, when the value is 0, 4 milliamperes; when 1, 20 milliamperes) to the current output circuit 23.

Exciting of the exciting coil 1 is performed according to an exciting method of lessening the excitation current value when the output current value from the current output circuit 23 is small and is performed according to an exciting method of increasing the excitation current value when the output current value is large for providing good S/N ratio of the electric signal detected by the electrodes 2 and 3. Thus, the excitation circuit control section 20 controls the excitation circuit 22 so as to change the excitation current value and the exciting method according to the magnitude of the output current value. At this time, the excitation circuit control section 20 receives the scaled value proportional to the output current value from the scaling section 18 and performs the control described above.

Since the zero point measurement values provided according to the different excitation current values and the different exciting methods differ, the zero point measurement section 14 measures the zero point measurement value according to each of the excitation current values and each of the exciting methods. To lessen the output current, the zero point measurement control section 16 sends data of 0, for example, to the scaling section 18. The scaling section 18 outputs 0, whereby the output current value becomes 4 mA and exciting corresponding to the value is performed. In this state, the zero point measurement section 14 computes the zero point measurement value and stores the value in the storage section 15. Next, to increase the output current, the zero point measurement control section 16 sends data of 0.5, for example, to the scaling section 18. The scaling section 18 outputs 0.5, whereby the output current value becomes 12 mA and exciting corresponding to the value is performed. In this state, the zero point measurement section 14 computes the zero point measurement value and stores the value in the storage section 15. In usual flow quantity computation, the zero point correction section 17 acquires the zero point measurement value corresponding to each of the excitation current values and the exciting methods from the storage section 15 and performs correction computation.

[Patent document 1] Japanese Patent Unexamined Publication No. 2002-340638

The zero point measurement value may change because of the effect of a deposit in the tube of the detector 4, the electric conductivity of the measurement fluid, etc. Thus, to lessen an error of the computed flow quantity value, zero point measurement is conducted on a regular basis or as required.

In a flow control system made up of the electromagnetic flowmeter 28, the controller 27, and a control valve (not shown), the zero point measurement is conducted in a state in which the control valve is forcibly closed for making a measurement fluid still. At this time, the output current value of the electromagnetic flowmeter 28 is about 4 milliamperes. Since the output current value increases to 12 milliamperes for several minutes during which the zero point measurement is conducted, output of the electromagnetic flowmeter 28 and the opening of the control valve do not match. Thus, the controller 27 may produce an anomaly caused by the mismatch. To prevent occurrence of the anomaly, the controller 27 is placed in an offline and then zero point measurement is conducted and thus the flow control is temporarily interrupted meanwhile.

On the other hand, when zero point measurement is conducted with the output current value decreased to 4 milliamperes, if the difference between the zero point measurement value and the preceding zero point measurement value is within a predetermined value range, change in the zero point measurement value of the measurement fluid scarcely occurs. In such a case, the output current value need not be increased to 12 milliamperes for conducting the zero point measurement.

SUMMARY

Exemplary embodiments of the present invention provide an electromagnetic flowmeter for performing zero point measurement without changing the output current of the electromagnetic flowmeter if the difference between the present zero point measurement value and the preceding zero point measurement value is within a predetermined value range as for zero point measurement of a measurement fluid in the electromagnetic flowmeter. If the difference is beyond the predetermined value range, the zero point measurement value of the measurement fluid changes and thus the output current is changed and zero point measurement is conducted.

To the end, according to the invention of a first aspect, there is provided an electromagnetic flowmeter for supplying an excitation current to an exciting coil for giving a magnetic field to a measurement fluid, detecting an electric signal occurring in the measurement fluid according to the magnetic field, and computing a flow quantity value based on the electric signal, the electromagnetic flowmeter including:

a zero point measurement section for measuring a zero point of the measurement fluid;

a storage section for storing the measured zero point measurement value;

a determination section for determining whether or not the difference between the preceding zero point measurement value stored in the storage section and the present zero point measurement value stored in the storage section is beyond a predetermined value range; and at least either a transmission section for transmitting the determination result or a display section for displaying the determination result when the determination section determines that the difference is beyond the predetermined value range.

The invention of a second aspect is as follows:

The electromagnetic flowmeter of the invention of the first aspect further includes an acquisition section for acquiring a request signal for further measuring a zero point of the measurement fluid based on at least either the transmitted or displayed determination result, wherein an output current, the excitation current, and an excitation method of the electromagnetic flowmeter are changed based on the acquired signal and then a zero point is measured by the zero point measurement section and the zero point measurement value is stored in the storage section.

The invention of a third aspect is as follows:

In the electromagnetic flowmeter of the invention of the first aspect, when the determination section determines that the difference is beyond the predetermined value range, further an output current, the excitation current, and an excitation method of the electromagnetic flowmeter are changed and then a zero point is measured by the zero point measurement section and the zero point measurement value is stored in the storage section.

The invention of a fourth aspect is as follows:

The electromagnetic flowmeter of the invention in any of the first aspect to third aspect is a two-wire electromagnetic flowmeter for receiving power supply from a transmission line for transmitting the output current.

According to the invention of a fifth aspect, there is provided a zero point measurement method of an electromagnetic flowmeter for supplying an excitation current to an exciting coil for giving a magnetic field to a measurement fluid, detecting an electric signal occurring in the measurement fluid according to the magnetic field, and computing a flow quantity value based on the electric signal, the zero point measurement method including the steps of:

measuring a zero point of the measurement fluid;

storing the measured zero point measurement value;

determining whether or not the difference between the stored preceding zero point measurement value and the stored present zero point measurement value is beyond a predetermined value range; and at least either transmitting the determination result or displaying the determination result when it is determined in the determining step that the difference is beyond the predetermined value range.

According to the invention, as for zero point measurement of a measurement fluid in the electromagnetic flowmeter, if the difference between the present zero point measurement value and the preceding zero point measurement value is within the predetermined value range, zero point measurement is performed without changing the output current of the electromagnetic flowmeter. Accordingly, occurrence of an anomaly caused by the controller can be prevented and the zero point measurement can be conducted with the controller placed in an online state.

Other features and advantages may be apparent from the following detailed description, the accompanying drawings and the claims.

DETAILED DESCRIPTION

First Embodiment

Figure 1:
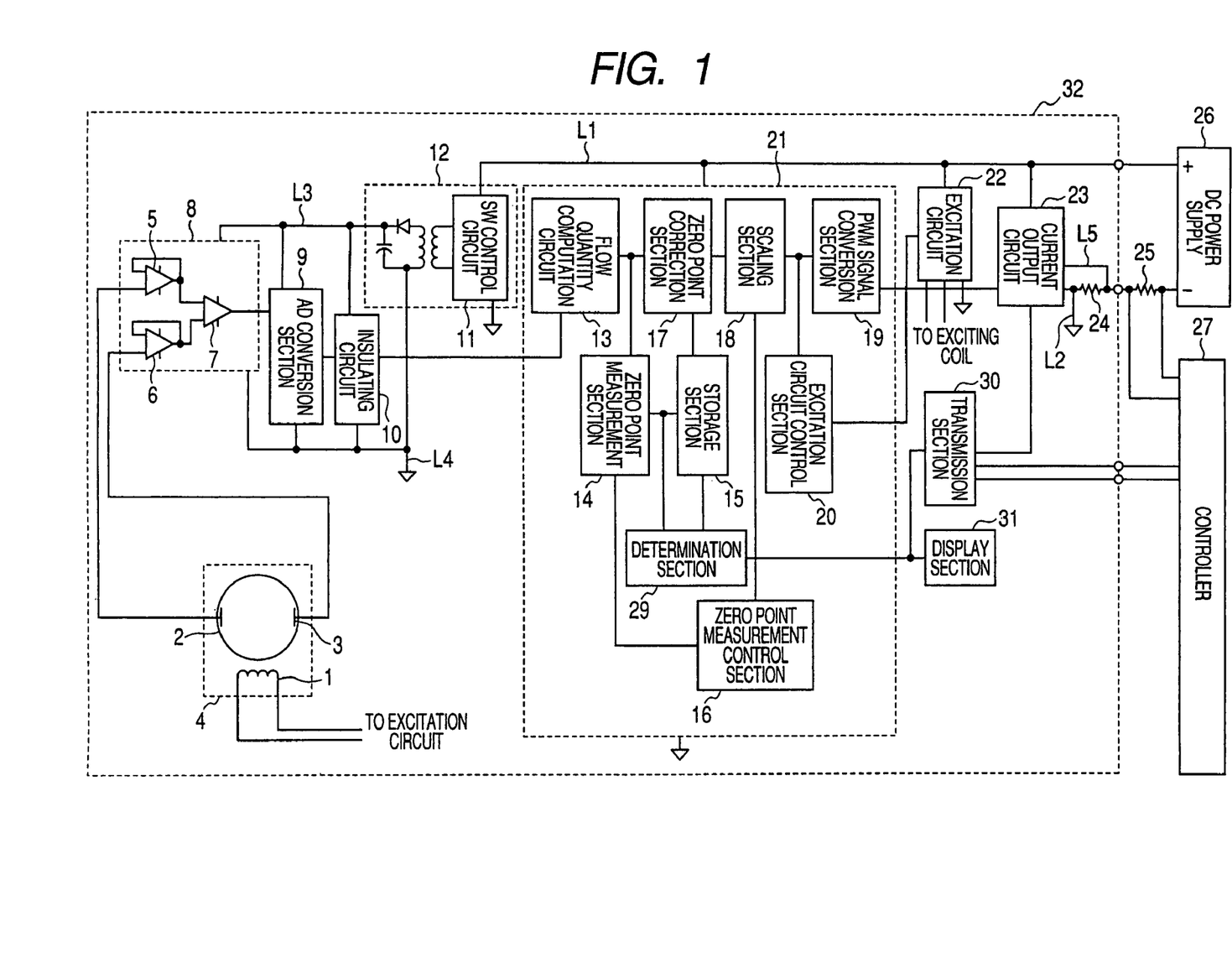
FIG. 1 is a block diagram of an electromagnetic flowmeter incorporating the invention.

A first embodiment of the invention will be discussed with FIG. 1. FIG. 1 is a block diagram of an electromagnetic flowmeter incorporating the invention. Components identical with those previously described with reference to FIG. 11 are denoted by the same reference numerals in FIG. 1 and will not be discussed again. The embodiment is intended for determining whether or not the difference between the present zero point measurement value and the preceding zero point measurement value is within a predetermined value range and transmitting and displaying the determination result if the difference is beyond the range.

An electromagnetic flowmeter 32 is made up of a detector 4, an amplification circuit 8, an AD conversion section 9, an insulating circuit 10, a DC-DC conversion circuit 12, a computation control section 21, a transmission section 30, a display section 31, an excitation circuit 22, a current output circuit 23, etc. It may include at least either of the transmission section 30 and the display section 31.

One of a pair of output terminals of the electromagnetic flowmeter 32 is connected to a positive terminal (+) of a DC power supply 26 and the other output terminal is connected to a negative terminal (−) of the DC power supply 26 through a resistor 25. The DC power supply 26 supplies a current (for example, ranging from 4 to 20 milliamperes) corresponding to the computed flow quantity value and DC voltage to the electromagnetic flowmeter 32. A controller 27 connected to both ends of the resistor 25 measures a current output from the electromagnetic flowmeter 32 according to a voltage occurring across the resistor 25, converts the measurement value into a flow quantity value, and performs process control (for example, flow control). A flow control system is made up of the electromagnetic flowmeter 32, the controller 27, and a control valve (not shown), and the controller 27 acquires output (flow quantity value) of the electromagnetic flowmeter 32 and controls the opening of the control valve so as to provide a target flow quantity value.

The output terminal connected to the positive terminal (+) of the DC power supply 26 is connected to a first power supply line L1. Power supply terminals of the computation control section 21, the excitation circuit 22, the current output circuit 23, the input side (SW control circuit 11) of the DC-DC conversion circuit 12, the transmission section 30, and the display section 31 are connected to the first power supply line L1.

A connection part of the current output circuit 23 and an output current detection resistor 24 is connected to a first common line L2. Common (reference potential) terminals of the computation control section 21, the excitation circuit 22, the current output circuit 23, the input side (SW control circuit 11) of the DC-DC conversion circuit 12, the transmission section 30, and the display section 31 are connected to the first common line L2. The computation control section 21, the excitation circuit 22, the current output circuit 23, the DC-DC conversion circuit 12, the transmission section 30, and the display section 31 receive power supply from the first power supply line L1.

A power supply terminal of the output side of the DC-DC conversion circuit 12 is connected to a second power supply line L3. Power supply terminals of the amplification circuit 8, the AD conversion section 9, and the insulating circuit 10 are connected to the second power supply line L3.

A common (reference potential) terminal of the output side of the DC-DC conversion circuit 12 is connected to a second common line L4. Common (reference potential) terminals of the amplification circuit 8, the AD conversion section 9, and the insulating circuit 10 are connected to the second common line L4. The amplification circuit 8, the AD conversion section 9, and the insulating circuit 10 receive power supply from the output of the DC-DC conversion circuit 12 (the second power supply line L3).

The excitation circuit 22 is connected to an excitation circuit control section 20 and an exciting coil 1. The excitation circuit 22 causes an excitation current to flow into the exciting coil 1 based on a control signal of the excitation circuit control section 20. The exciting coil 1 generates a magnetic field in a tube of the detector 4 and gives the magnetic field to a measurement fluid in the tube, whereby an electric signal (electromotive force) proportional to the magnetic flux density of the magnetic field and the flow velocity of the measurement fluid occurs in the measurement fluid flowing through the tube. The detector 4 is made up of the exciting coil 1, electrodes 2 and 3, the tube for allowing a measurement fluid to flow (not shown), etc., and the electric signal is detected by the electrodes 2 and 3 placed in the tube.

The amplification circuit 8 is made up of buffers (voltage followers) 5 and 6 and a differential amplifier 7. Inputs of the buffers 5 and 6 are connected to the electrodes 2 and 3 and outputs of the buffers 5 and 6 are connected to input of the differential amplifier 7. The buffers 5 and 6 execute impedance conversion of the electric signals detected by the electrodes 2 and 3, and the differential amplifier 7 generates a difference signal between the outputs of the buffers 5 and 6 and outputs the difference signal to the AD conversion section 9. The difference signal is proportional to the flow velocity of the measurement fluid.

The AD conversion section 9 converts the analog difference signal into digital data and outputs the digital data to a flow quantity computation section 13 through the isolation circuit 10. The insulating circuit 10 has an interface function for executing signal conversion so that a signal can be transferred between circuits different in reference potential (first common line L2 and second common line L4). The insulating circuit 10 uses an optical transmission device of a photocoupler, etc., for example, and a transformer.

The DC-DC conversion circuit 12 is an insulation-type DC voltage conversion circuit of an inverter system. The input side of the DC-DC conversion circuit 12 is made up of the SW (switching) control circuit and one winding of a transformer connected to the SW control circuit. The output side is made up of the other winding of the transformer, a diode connected to the winding, and a capacitor connected to the diode. The DC-DC conversion circuit 12 converts DC voltage of the first power supply line L1 into AC voltage by the SW control circuit 11 and steps up or down the voltage with the transformer and then rectifies the voltage by the diode and the capacitor and converts the voltage into DC voltage of the second power supply line L3. Accordingly, the circuits connected to the first power supply line L1 and the first common line L2 are electrically insulated from the circuits connected to the second power supply line L3 and the second common line L4.

The computation control section 21 is made up of the above-mentioned flow quantity computation section 13, a zero point measurement section 14, a storage section 15, a zero point measurement control section 16, a zero point correction section 17, a determination section 29, a scaling section 18, a PWM signal conversion section 19, and the above-mentioned excitation circuit control section 20 and performs operation control and signal processing of the electromagnetic flowmeter 32.

The flow quantity computation section 13 performs operation such as multiplying the digital data of the difference signal proportional to the flow velocity of the measurement fluid input from the isolation circuit 10 by the inner diameter in the tube of the detector 4 and computes the flow quantity value of the measurement fluid. The zero point measurement section 14 acquires the flow quantity value in a state in which the measurement fluid is made still (which will be hereinafter referred to as "zero point measurement value") from the flow quantity computation section 13 and stores the zero point measurement value in the storage section 15.

To remove an error caused by the zero point measurement value, the zero point correction section 17 subtracts the zero point measurement value stored in the storage section 15 from the flow quantity value computed in the flow quantity computation section to compute the flow quantity value subjected to zero point correction. The flow velocity in the state in which the measurement fluid is made still may be stored as the zero point measurement value and the zero point measurement value (flow velocity) may be subtracted from the flow quantity value computed in the flow quantity computation section 13 and then the flow quantity value may be computed.

The scaling section 18 receives the flow quantity value subjected to zero point correction and scales (normalizes) the value relative to a predetermined flow quantity value (for example, in the range of 0 to 1, a predetermined flow quantity value is set to 1). The PWM signal conversion section 19 receives the scaled value and outputs a PWM signal (pulse width modulation signal) having a duty to output a current proportional to the value (for example, when the value is 0, 4 milliamperes; when 1, 20 milliamperes) to the current output circuit 23.

Exciting of the exciting coil 1 is performed according to an exciting method of lessening the excitation current value when the output current value from the current output circuit 23 is small and is performed according to an exciting method of increasing the excitation current value when the output current value is large. The excitation current value is increased, whereby the electric signals detected by the electrodes 2 and 3 become large, so that the S/N ratio can be improved.

Thus, the excitation circuit control section 20 controls the excitation circuit 22 so as to change the excitation current value and the exciting method according to the magnitude of the output current value. The excitation circuit control section 20 receives the scaled value proportional to the output current value from the scaling section 18 and performs the control described above. In particular, in FIG. 6B, when the output current value is small (for example, less than 12 milliamperes), the excitation current value is lessened (for example, the maximum current is several milliamperes) and three-valued excitation is performed. When the output current value is large (for example, 12 milliamperes or more), the excitation current value is increased (for example, the maximum current is several ten milliamperes) and two-frequency excitation or two-valued excitation is performed.

Figure 5:
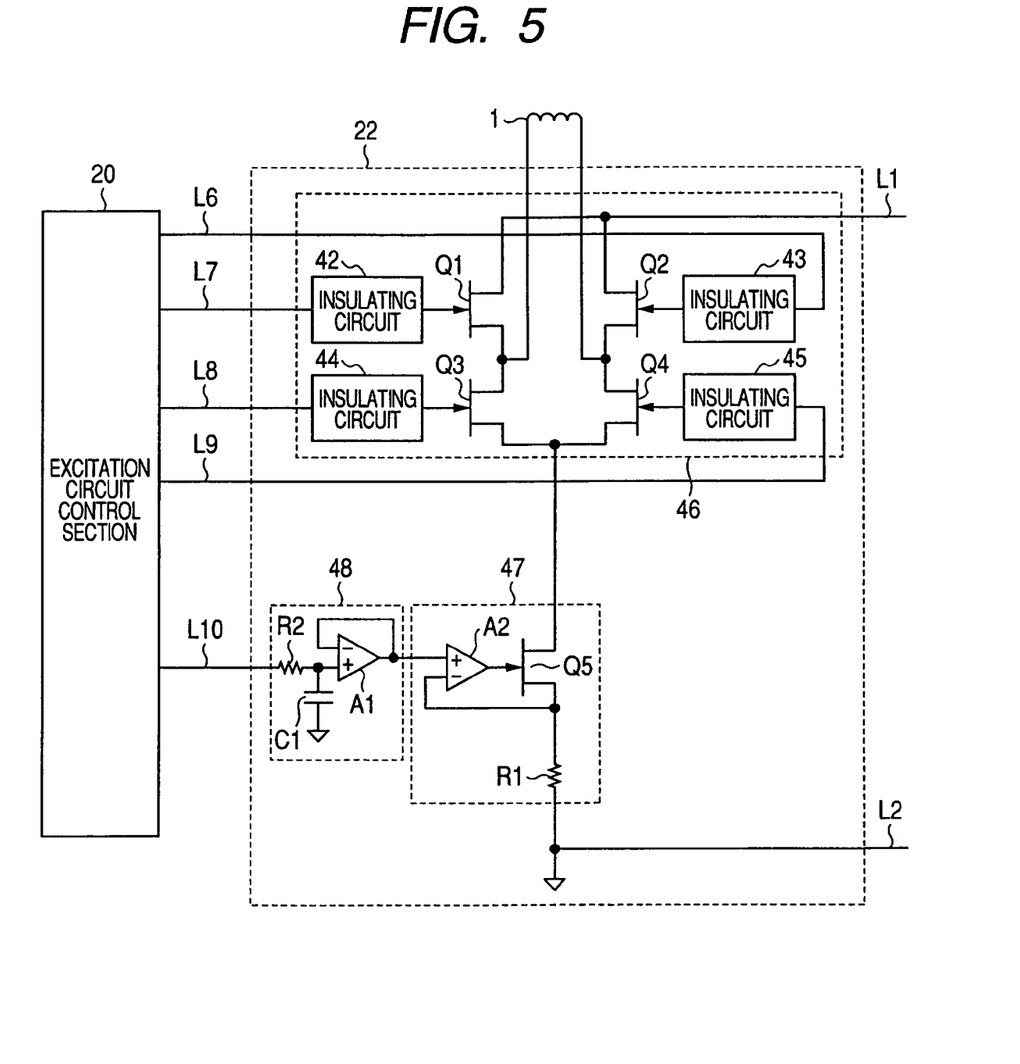
FIG. 5 is a block diagram of an excitation circuit 22.

The operation of the excitation circuit 22 will be discussed with FIGS. 5 and 6. FIG. 5 is a circuit block diagram of the excitation circuit 22 and FIG. 6 represents excitation control patterns. The excitation circuit control section 20 outputs an excitation PWM signal L10 to the excitation circuit 22 for controlling the excitation current value and outputs timing signals L6 to L9 for controlling the excitation current flowing direction and time.

The excitation circuit 22 is made up of an excitation current direction switching circuit 46, a constant current control circuit 47, and a low-pass filter 48. The excitation current direction switching circuit 46 and the constant current control circuit 47 are connected in series between the first power supply line L1 and the first common line L2. The exciting coil 1 is connected at both ends to a connection part of transistors Q1 and Q3 of the excitation current direction switching circuit 46 and a connection part of transistors Q2 and Q4. The transistors Q1 to Q4 may be FETs (field-effect transistors).

The low-pass filter 48 is made up of a resistor R2, a capacitor C1, and an operational amplifier A1, and the constant current control circuit 47 is made up of a resistor R1, a transistor Q5, and an operational amplifier A2.

The excitation PWM signal L10 is input from the excitation circuit control section 20 to the low-pass filter 48 and is smoothed by the resistor R2 and the capacitor C1. The smoothed voltage is buffered by the operational amplifier A1 and is input to the constant current control circuit 47. The constant current control circuit 47 operates so that detection voltage as the excitation current flowing into the exciting coil 1 is detected in the resistor R1 and output of the operational amplifier A1 match, and causes a constant excitation current to flow into the exciting coil 1. Thus, the constant excitation current corresponding to the duty of the excitation PWM signal L10 flows from the first power supply line L1 via the transistor Q1 (or Q2), the exciting coil 1, the transistor Q4 (or Q3), the transistor Q5, and the resistor R1 into the first common line L2. In FIG. 6B, the duty of the excitation PWM signal L10 is lessened, thereby allowing a small excitation current to flow; the duty is increased, thereby allowing a large excitation current to flow.

Figure 6A:
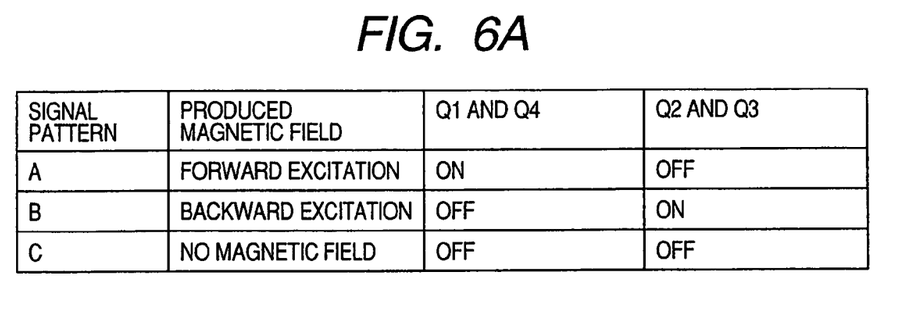
FIG. 6 is a table to show combinations of excitation currents, excitation methods, and operation of transistors Q1 to Q4 of the excitation circuit 22.
Figure 6B:
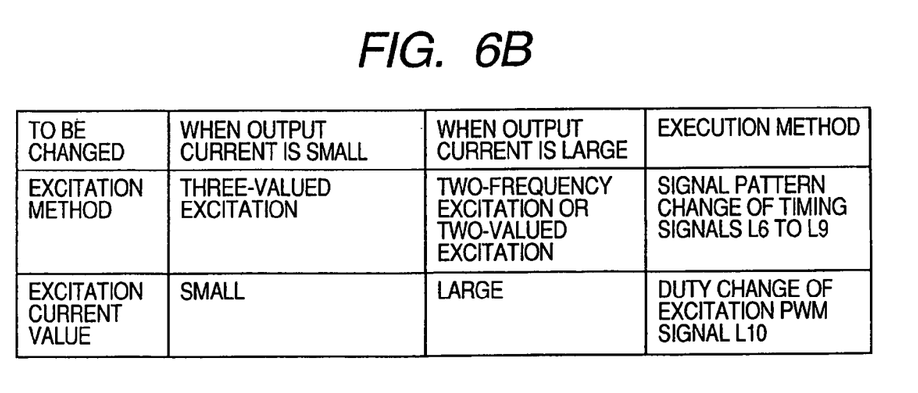

The excitation current direction switching circuit 46 controls the excitation current flowing direction and time according to the signal patterns shown in FIG. 6A. In signal pattern A, the transistors Q1 and Q4 are turned on based on timing signals L7 and L9 output from the excitation circuit control section 20 and the transistors Q2 and Q3 are turned off based on timing signals L6 and L8 output from the excitation circuit control section 20, whereby the excitation current flows from the first power supply line L1 via the transistor Q1, the exciting coil 1, the transistor Q4, the transistor Q5, and the resistor R1 into the first common line L2. The direction of the magnetic field generated by the exciting coil 1 according to the excitation current is the forward direction.

In signal pattern B, the transistors Q1 and Q4 are turned off based on timing signals L7 and L9 output from the excitation circuit control section 20 and the transistors Q2 and Q3 are turned on based on timing signals L6 and L8 output from the excitation circuit control section 20, whereby the excitation current flows from the first power supply line L1 via the transistor Q2, the exciting coil 1, the transistor Q3, the transistor Q5, and the resistor R1 into the first common line L2. The direction of the magnetic field generated by the exciting coil 1 according to the excitation current is the backward direction.

In signal pattern C, the transistors Q1 to Q4 are turned off based on timing signals L6 to L9 output from the excitation circuit control section 20, whereby no excitation current flows and the exciting coil 1 does not generate a magnetic field. The timing signals L6 to L9 are input via insulating circuits 42 to 45 to the transistors Q1 to Q4.

The three-valued excitation is performed as the signal patterns A, C, B, C, A, C are repeated. The two-valued excitation is performed as the signal patterns A, B, A, B are repeated. The two-frequency excitation is performed as two-valued excitation at high repetition frequency (for example, several ten Hz) and two-valued excitation at low repetition frequency (for example, several Hz) are combined.

Figure 7:
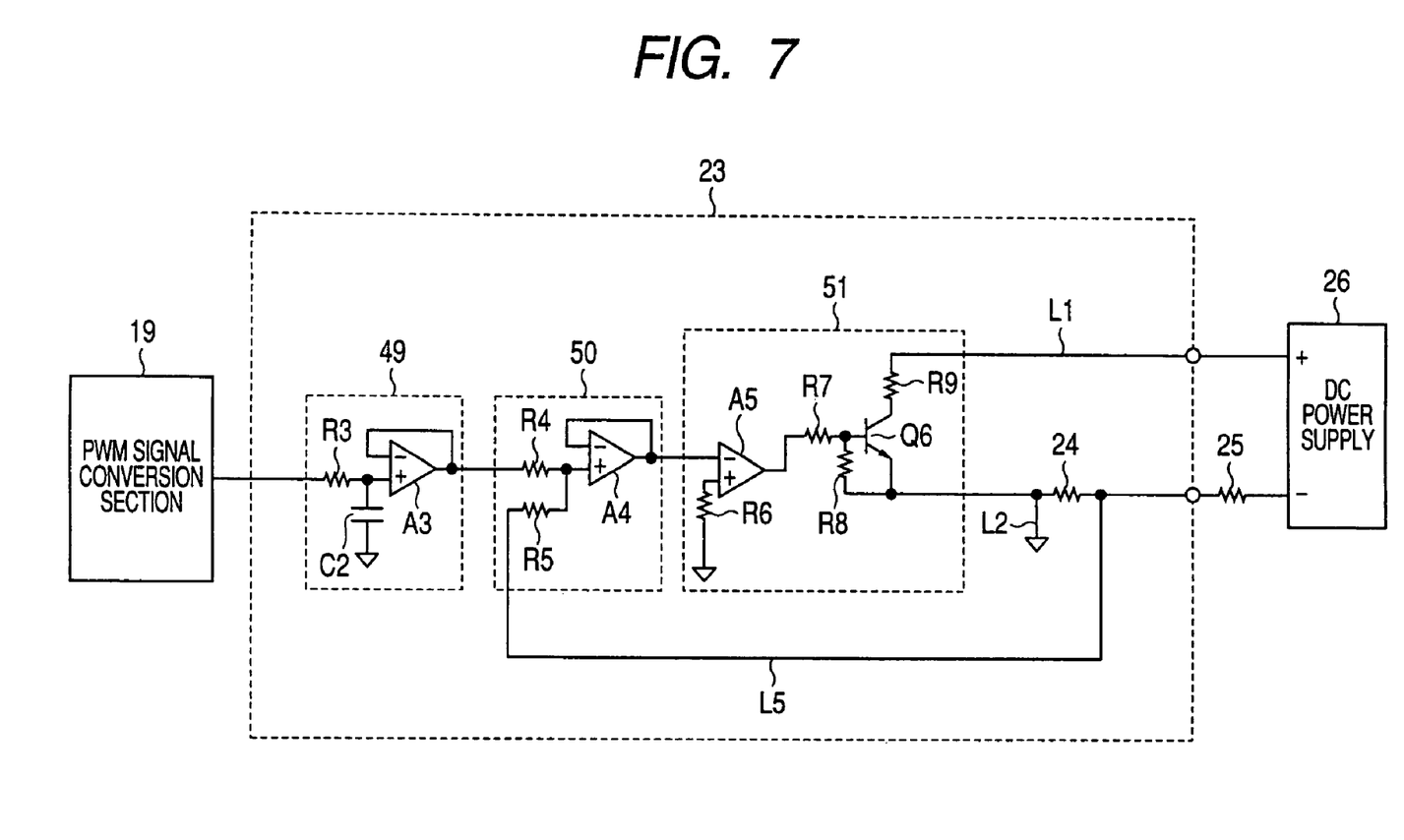
FIG. 7 is a block diagram of a current output circuit 23.

The operation of the current output circuit 23 will be discussed with FIG. 7. FIG. 7 is a block diagram of the current output circuit 23. The current output circuit 23 is made up of a low-pass filter 49, an adder 50, an output current control circuit 51, and an output current detection resistor 24. The first power supply line L1, a resistor R9, a transistor Q6, the output current detection resistor 24, and the resistor 25 are connected in series between the positive terminal (+) and the negative terminal (−) of the DC power supply 26. The first common line L2 is connected to a connection part of the transistor Q6 and the output current detection resistor 24.

The low-pass filter 49 is made up of a resistor R3, a capacitor C2, and an operational amplifier A3, the adder 50 is made up of resistors R4 and R5 and an operational amplifier A4, and the output current control circuit 51 is made up of resistors R6 to R9, the transistor Q6, and an operational amplifier A5.

A PWM signal output from the PWM signal conversion section 19 is input to the low-pass filter 49 and is smoothed by the resistor R3 and the capacitor C2. The smoothed voltage is buffered by the operational amplifier A3 and is input to the adder 50.

Current flowing into the inside of the electromagnetic flowmeter (circuits, etc.) toward a resistor R25 flows into the output current detection resistor 24 via the first common line L2 and current passed through the resistor R9 and the transistor Q6 further flows into the output current detection resistor 24 and an output current detection voltage L5 occurs. The adder 50 adds voltage input from the low-pass filter 49 and the output current detection voltage L5 and outputs the resultant voltage to the output current control circuit 51. The output current control circuit 51 adjusts the current flowing into the transistor Q6 so as to set the resultant voltage almost to zero (potential of the first common line L2). Since the absolute values of the output voltage of the low-pass filter 49 and the output current detection voltage L5 become equal, a current proportional to the duty of the PWM signal output from the PWM signal conversion section 19 flows into the output current detection resistor 24. Since the duty of the PWM signal is proportional to the flow quantity value subjected to zero point correction, an output current proportional to the flow quantity value subjected to zero point correction flows into the resistor 25.

Figure 8:
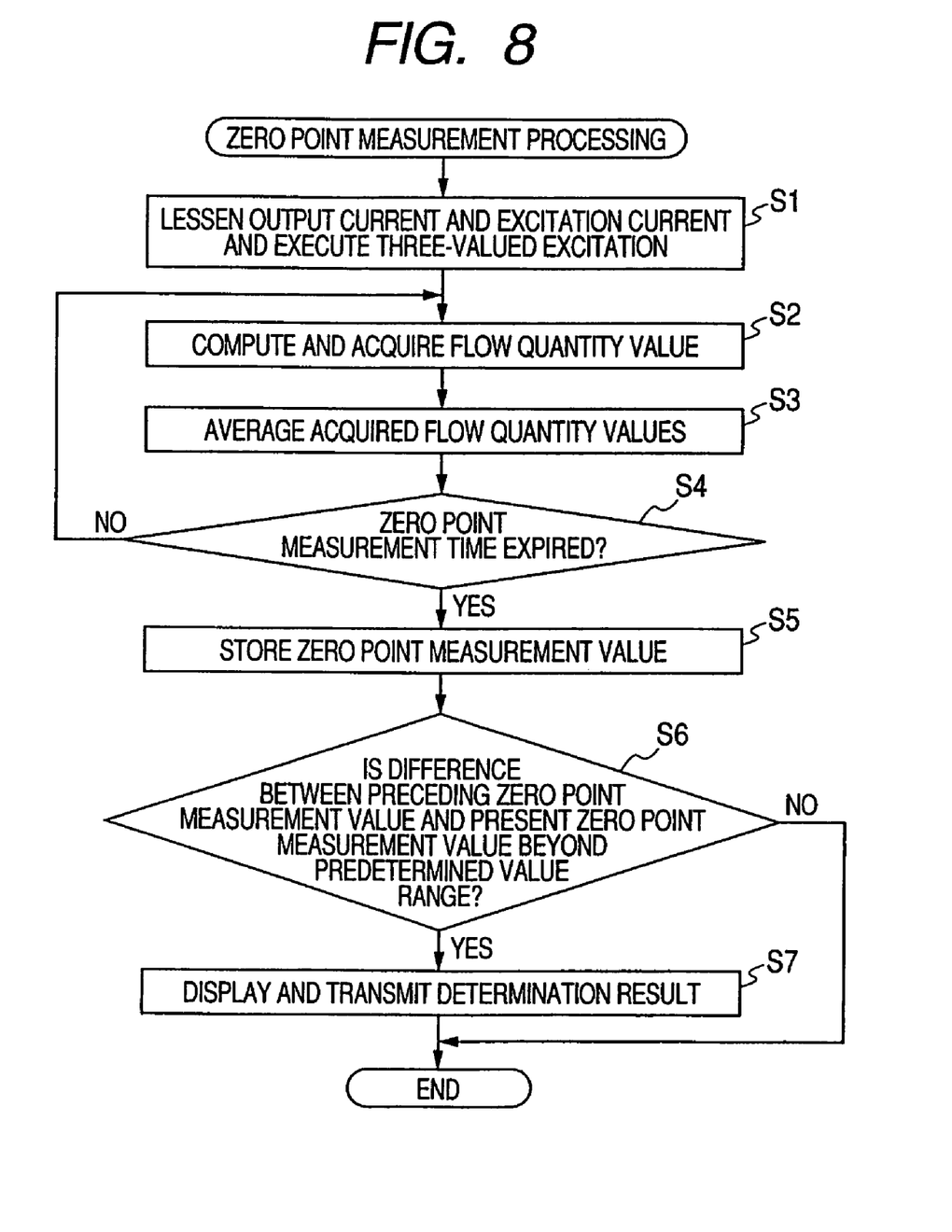
FIG. 8 is a flowchart of the operation of zero point measurement processing incorporating the invention.

Next, zero point measurement will be discussed also using FIG. 8. FIG. 8 is a flowchart of zero point measurement processing performed by the computation control section 21. The zero point measurement values measured in the excitation current values and the excitation methods shown in FIG. 6 B differ. Thus, after a measurement fluid is made still, the zero point measurement section measures the zero point measurement value in the excitation current value and the excitation method shown in FIG. 6 B. The zero point correction section 17 subtracts the zero point measurement value corresponding to each excitation current value and excitation method and performs correction computation.

The zero point measurement processing is started as a transmission signal having a zero point measurement execution command from the controller 27 is received through the resistor 25, the current output circuit 23, and a communication section (not shown) or as a contact input signal (not shown) to execute zero point measurement from the controller 27 is received.

The zero point measurement control section 16 sends data of 0 to the scaling section 18, which then outputs the received data of 0, and the output current is set to 4 mA and becomes small. The excitation circuit 22 lessens the excitation current and executes three-valued excitation based on the timing signals L6 to L10 from the excitation circuit control section 20 (step S1). The zero point measurement section 14 acquires the computed flow quantity value from the flow quantity computation section 13 based on a control signal of the zero point measurement control section 16 (step S2). To obtain a stable zero point measurement value, zero point measurement is conducted continuously for several minutes. Thus, the acquired flow quantity values are averaged (step S3) and if the zero point measurement time (several minutes) does not expire (step S4), the process is repeated starting at S1; if the zero point measurement time expires, step S5 is executed. The average flow quantity value provided at step S3 is stored in the storage section 15 as zero point measurement value (which will be hereinafter referred to as "present zero point measurement value") (step S5).

The determination section 29 determines whether or not the difference between the preceding zero point measurement value measured in the preceding zero point measurement and stored in the storage section 15 and the present zero point measurement value is beyond a predetermined value range (step S6). If the difference is within the range (for example, in the range of −1% to +1% of the flow quantity value corresponding to output of 100%), change in the zero point measurement value of the measurement fluid scarcely occurs. Thus, zero point measurement in a state in which the output current and the excitation current are increased and the excitation method is changed is not performed and the zero point measurement processing is terminated. On the other hand, if the difference is beyond the range, the zero point measurement value of the measurement fluid changes and thus the determination section 29 outputs the determination result to the transmission section 30 and the display section 31 (step S7). The transmission section 30 transmits a transmission signal having the determination result to the controller 27 through the current output circuit 23 and outputs a contact signal representing the determination result to the controller 27. The display section 31 has a display function of a liquid crystal display section, etc., and displays the determination result.

According to the embodiment, as for the zero point measurement of a fluid in the electromagnetic flowmeter, if the difference between the present zero point measurement value and the preceding zero point measurement value is within the predetermined value range, zero point measurement is conducted without changing the output current of the electromagnetic flowmeter. Accordingly, occurrence of an anomaly caused by the controller can be prevented and the zero point measurement can be conducted with the controller placed in an online state. If the difference is beyond the range, the determination result is transmitted to the controller and is displayed, whereby the user can be informed of the determination result.

Second Embodiment

Figure 2:
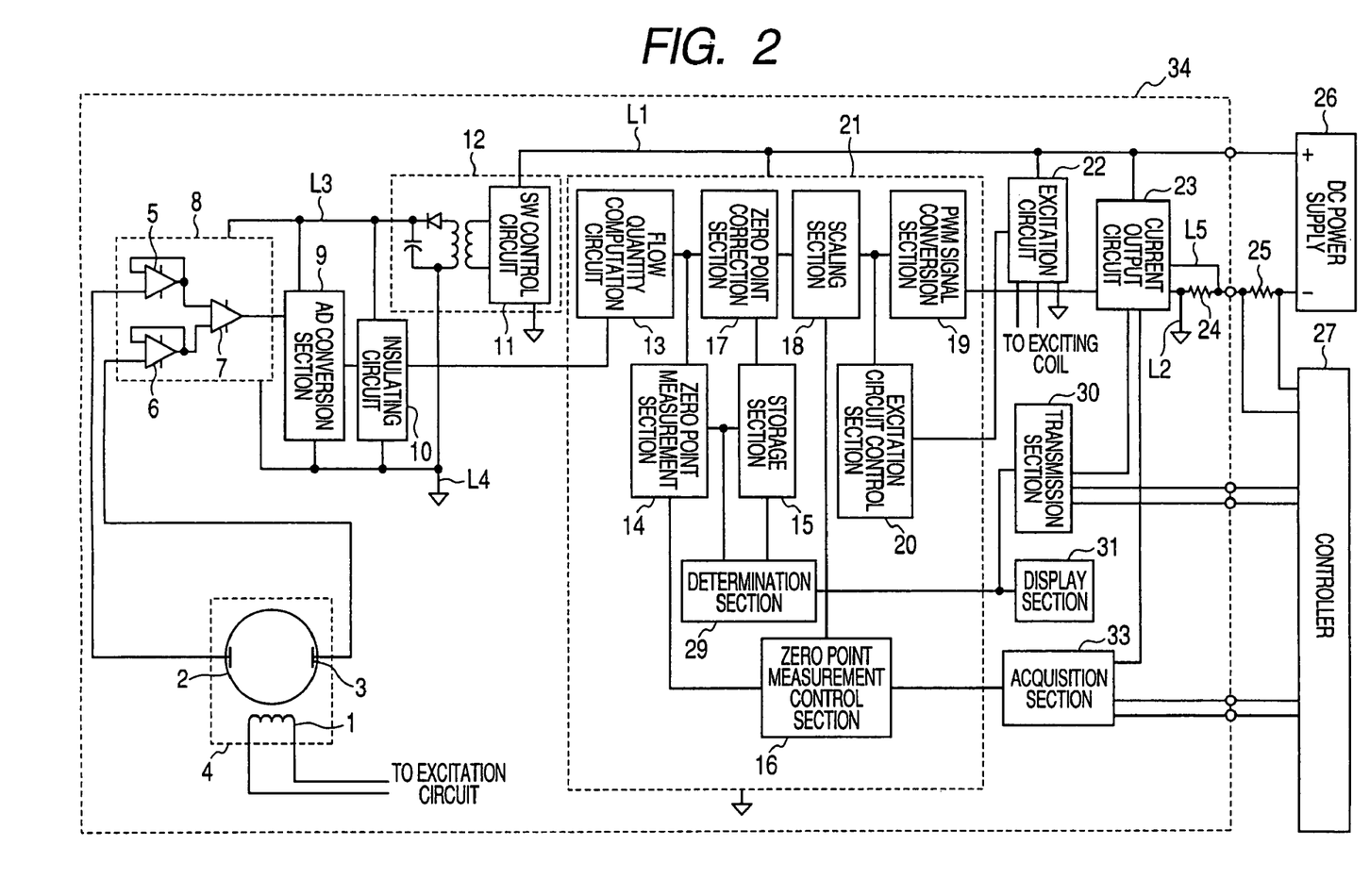
FIG. 2 is a block diagram of another electromagnetic flowmeter incorporating the invention.

A second embodiment of the invention will be discussed with FIG. 2. FIG. 2 is a block diagram of an electromagnetic flowmeter incorporating the invention. Components identical with those previously described with reference to FIG. 1 are denoted by the same reference numerals in FIG. 2 and will not be discussed again. The embodiment is intended for changing output current, etc., and conducting zero point measurement based on a zero point measurement request signal when the difference between the present zero point measurement value and the preceding zero point measurement value is beyond a predetermined value range. In FIG. 2, an acquisition section 33 is added to the electromagnetic flowmeter in FIG. 1 and a power supply terminal of the acquisition section 33 is connected to a first power supply line L1 and a common (reference potential) terminal is connected to a first common line L2.

Figure 9:
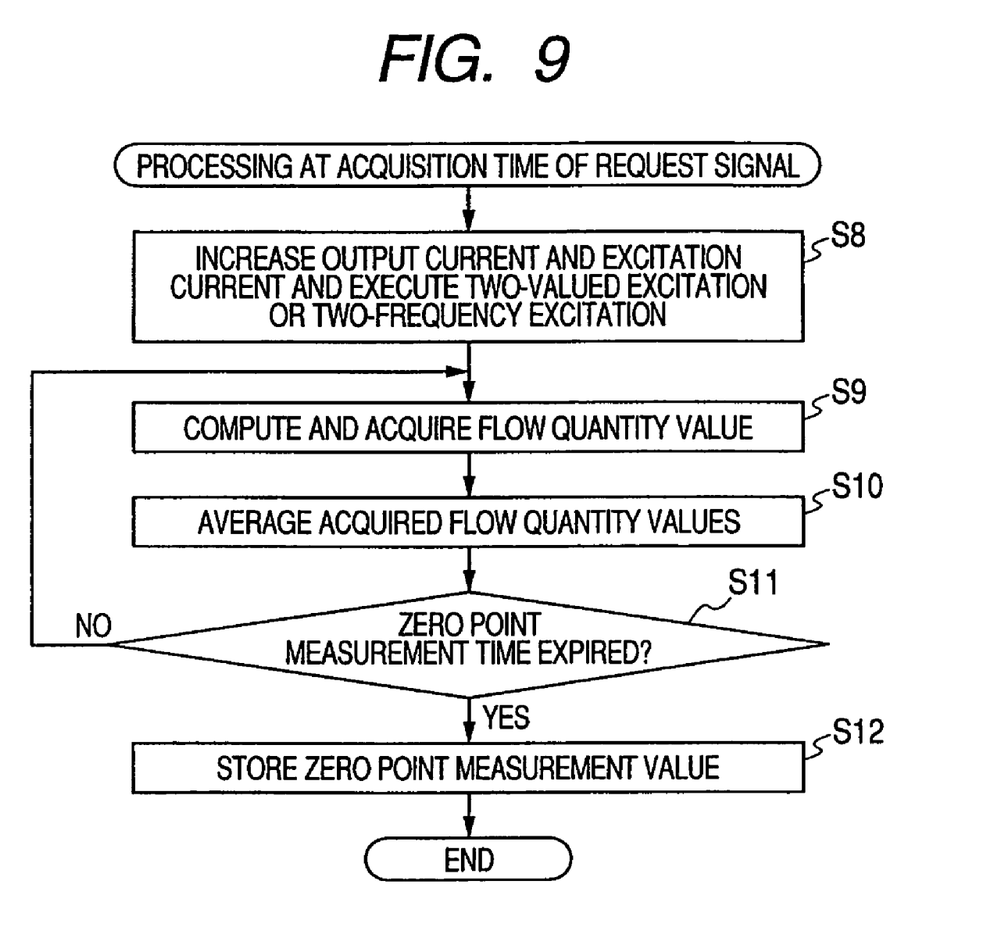
FIG. 9 is a flowchart of the operation at the acquisition time of a request signal incorporating the invention.

The zero point measurement will be discussed also using FIG. 9. FIG. 9 is a flowchart of processing at the time of acquiring the request signal. In the zero point measurement processing in FIG. 8, when it is determined that the difference between the preceding zero point measurement value and the present zero point measurement value is beyond the predetermined value range (step S6) and the determination result is transmitted by the transmission section 30 and displayed by the display section 31 (step S7), the zero point measurement value of the measurement fluid changes and thus zero point measurement is also conducted in a state in which the output current and the excitation current are increased and the excitation method is changed.

Upon reception of the determination result, a controller 27 further transmits a request signal for conducting zero point measurement, and the acquisition section 33 receives the signal through a resistor 25, a current output circuit 23, and a communication section (not shown).

Upon reception of the request signal from the acquisition section 33, a zero point measurement control section 16 sends data of 0.5 to a scaling section 18, which then outputs the received data of 0.5, and the output current is set to 12 mA and becomes large. An excitation circuit 22 increases the excitation current and executes two-frequency excitation or two-valued excitation based on timing signals L6 to L10 from an excitation circuit control section 20 (step S8). A zero point measurement section 14 acquires the computed flow quantity value from a flow quantity computation section 13 based on a control signal of the zero point measurement control section 16 (step S9). To obtain a stable zero point measurement value, zero point measurement is conducted continuously for several minutes. Thus, the acquired flow quantity values are averaged (step S10) and if the zero point measurement time (several minutes) does not expire (step S11), the process is repeated starting at S1; if the zero point measurement time expires, the average flow quantity value provided at step S10 is stored in a storage section 15 as zero point measurement value (which will be hereinafter referred to as "present zero point measurement value") (step S12). The controller 27 may output the request signal to the acquisition section 33 as a contact signal. The user may confirm the determination result displayed on the display section 31 and may send a request signal through the controller 27.

Figure 10:
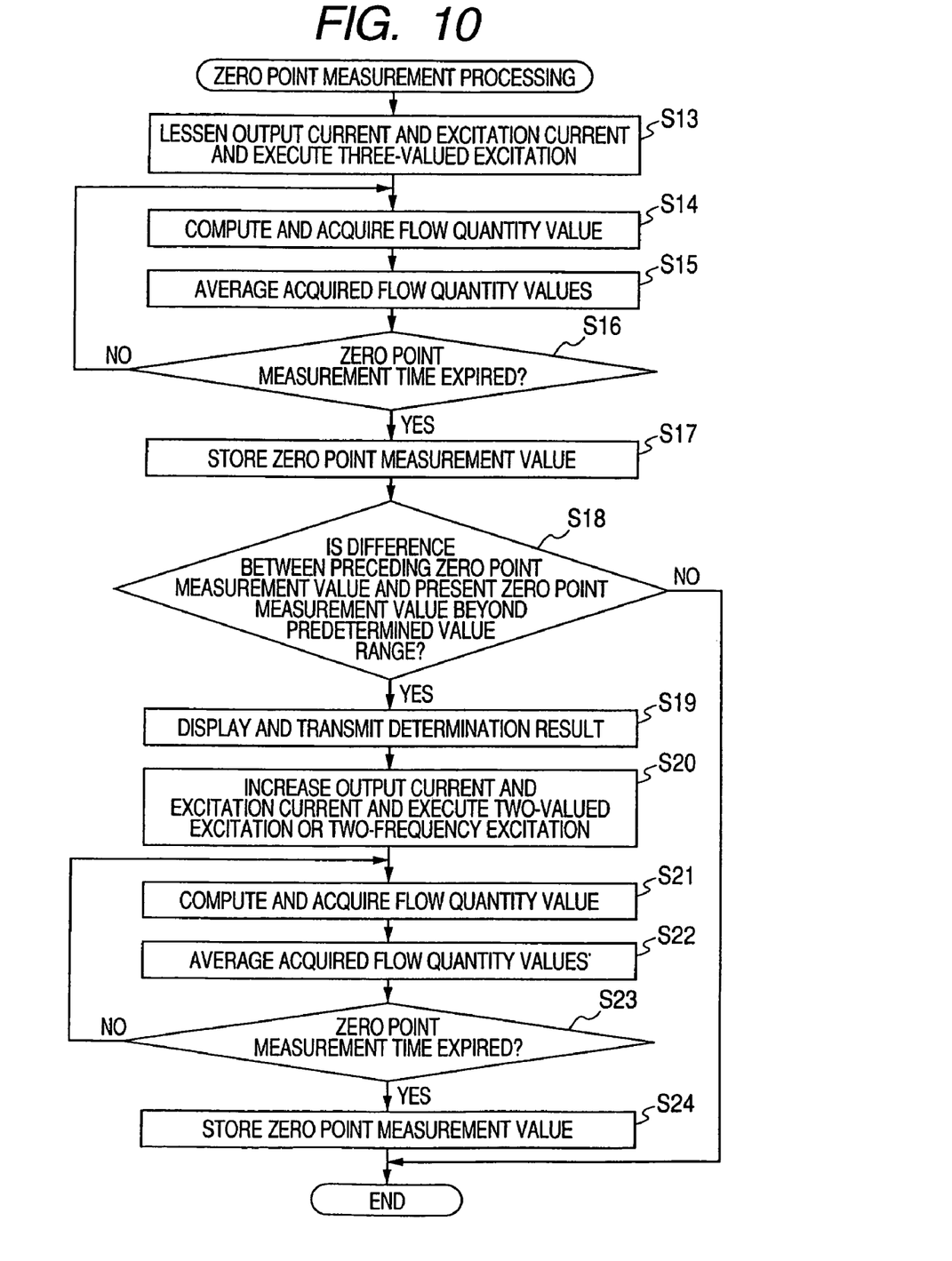
FIG. 10 is a flowchart of the operation of different zero point measurement processing incorporating the invention.

In FIG. 10, the zero point measurement control section 16 increases the output current and the excitation current and changes the excitation method and conducts zero point measurement (steps S19 to S24) when it is determined that the difference between the preceding zero point measurement value and the present zero point measurement value is beyond a predetermined value range (steps S13 to S18) regardless of the request signal. On the other hand, no processing is performed when it is determined that the difference is within the predetermined value range. FIG. 10 is a flowchart of the zero point measurement processing. Steps S13 to S19 are similar to S1 to S7 in FIG. 8 and steps S20 to S24 are similar to S8 to S12 in FIG. 9.

According to the embodiment, if the difference between the present zero point measurement value and the preceding zero point measurement value is beyond the predetermined value range, the output current of the electromagnetic flowmeter is changed and zero point measurement is conducted and an error of output of the electromagnetic flowmeter caused by change in the present zero point measurement value can be removed.

Third Embodiment

Figure 3:
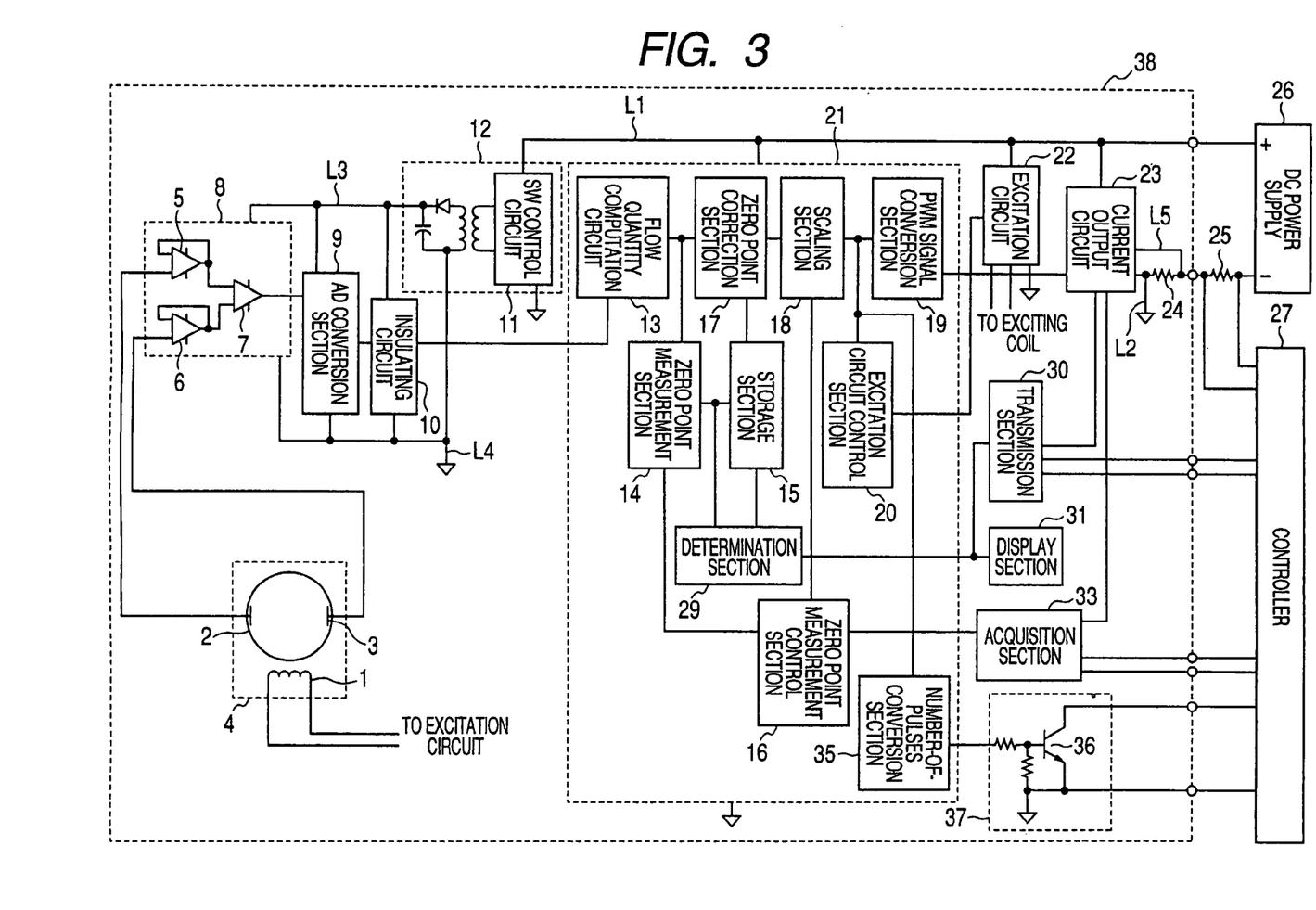
FIG. 3 is a block diagram of another electromagnetic flowmeter incorporating the invention.

A third embodiment of the invention will be discussed with FIG. 3. FIG. 3 is a block diagram of an electromagnetic flowmeter incorporating the invention. Components identical with those previously described with reference to FIG. 2 are denoted by the same reference numerals in FIG. 3 and will not be discussed again. The embodiment is intended for converting the computed flow quantity value into the number of pulses or output.

In FIG. 3, a number-of-pulses conversion section 35 and a pulse output circuit 37 are added to the electromagnetic flowmeter in FIG. 2. The pulse output circuit 37 is made up of a transistor 36 and a resistor and output of the number-of-pulses conversion section 35 is input to a base of the transistor 36 through the resistor. The resistor is connected between the base and an emitter of the transistor 36 and a first common line L2 is connected to the emitter. A collector and the emitter of the transistor 36 are connected to a controller 27 through a pair of output terminals.

The number-of-pulses conversion section 35 receives a value scaled in a scaling section 18 and multiplies the value by a coefficient for converting into a predetermined number of pulses to compute the number of pulses. The number-of-pulses conversion section 35 outputs a pulse signal corresponding to the computed number of pulses to the pulse output circuit 37. The pulse output circuit 37 transmits the pulse signal to the controller 27 by turning on and off the transistor 36. A computation control section 21 may use a microprocessor to perform processing.

According to the embodiment, the pulse signal corresponding to the flow quantity value subjected to zero point correction is output to the controller, whereby the controller can acquire the flow quantity value as a digital value (count) and can perform flow control.

Figure 4:
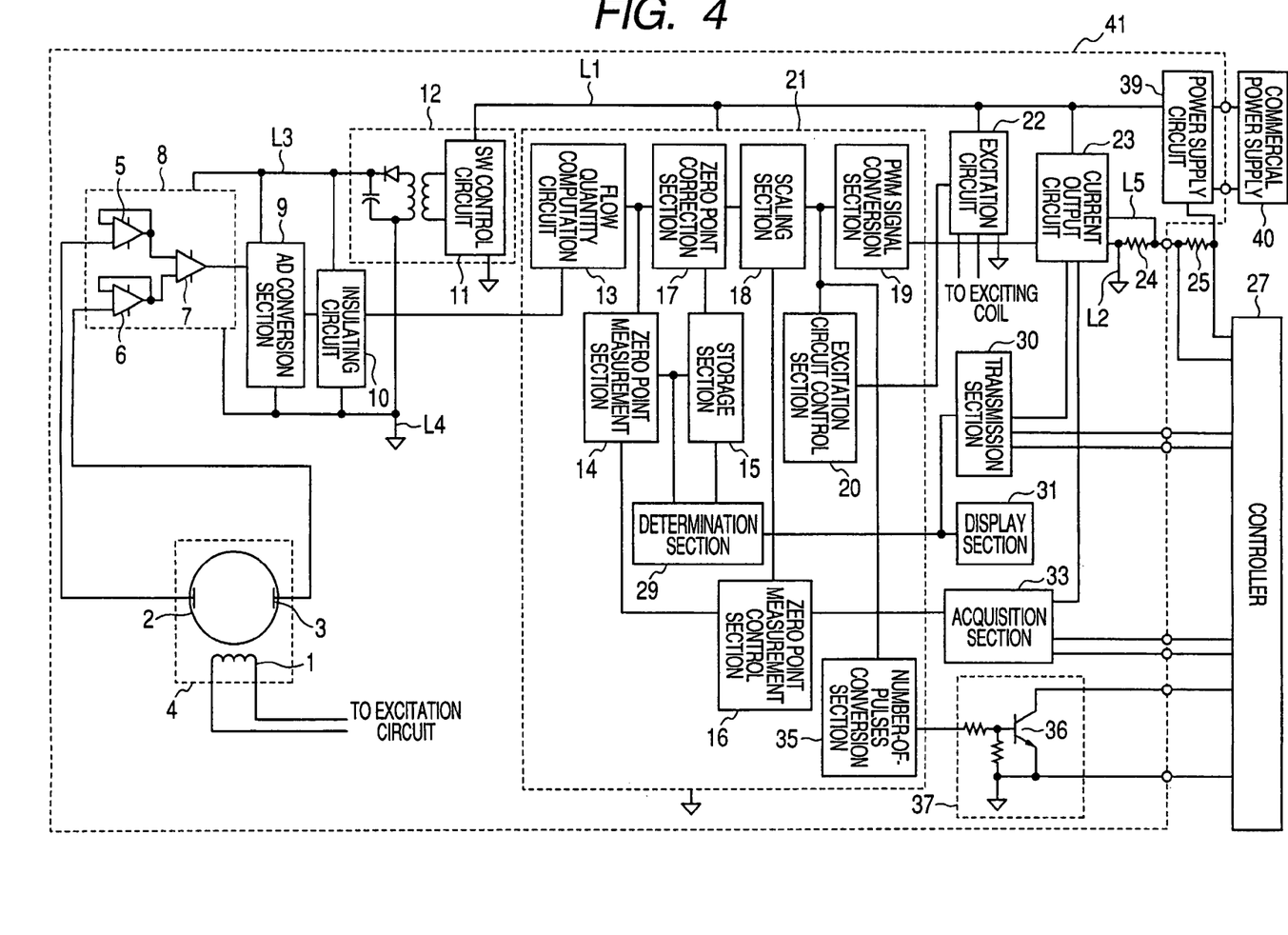
FIG. 4 is a block diagram of an electromagnetic flowmeter incorporating the invention for receiving power from a commercial power supply.

FIG. 4 is a block diagram of an electromagnetic flowmeter incorporating the invention. The electromagnetic flowmeter is an electromagnetic flowmeter for receiving power from a commercial power supply (for example, 100 V) having a commercial frequency (for example, 50 Hz or 60 Hz). Components identical with those previously described with reference to FIG. 3 are denoted by the same reference numerals in FIG. 4 and will not be discussed again.

A commercial power supply 40 is connected to a power supply circuit 39 through a pair of terminals. The power supply circuit 39 converts AC voltage input from the commercial power supply 40 into DC voltage and supplies the DC voltage to a first power supply line L1. Accordingly, similar zero point measurement processing can also be accomplished in the electromagnetic flowmeter for receiving power from the commercial power supply.

Although output of the electromagnetic flowmeter has been described about the electric signal in the range of 4 to 20 milliamperes, the electromagnetic flowmeter may be an electromagnetic flowmeter for conducting field bus communications (foundation field bus, profi bus, etc.).

What is claimed is:

1. An electromagnetic flowmeter for supplying an excitation current to an exciting coil for giving a magnetic field to a measurement fluid, detecting an electric signal occurring in the measurement fluid according to the magnetic field, and computing a flow quantity value based on the electric signal, said electromagnetic flowmeter comprising:
   a zero point measurement section which measures a zero point of the measurement fluid;
   a storage section which stores the measured zero point measurement value;
   a determination section which determines whether the difference between a preceding zero point measurement value stored in said storage section and a present zero point measurement value stored in said storage section is beyond a value range; and
   at least either a transmission section which transmits the determination result or a display section which displays the determination result when said determination section determines that the difference is beyond the value range;
   wherein when said determination section determines that the difference is beyond the value range, an output current, the excitation current, and an excitation method of said electromagnetic flowmeter are changed, and the zero point is then measured by said zero point measurement section and the zero point measurement value is stored in said storage section,
   wherein the excitation method is changed between (a) a three-valued excitation method based on three signal patterns and (b) a two-frequency excitation method at a high repetition frequency and a low repetition frequency or two-valued excitation method based on two signal patterns.

2. The electromagnetic flowmeter as claimed in claim 1 further comprising:
   an acquisition section which acquires a request signal for further measuring a zero point of the measurement fluid based on the transmitted or displayed determination result,
   wherein the output current, the excitation current, and the excitation method of said electromagnetic flowmeter are changed based on the acquired signal and then the zero point is measured by said zero point measurement section and the zero point measurement value is stored in said storage section.

3. The electromagnetic flowmeter as claimed in claim 1 wherein said electromagnetic flowmeter is a two-wire electromagnetic flowmeter for receiving power supply from a transmission line for transmitting an output current.

4. A zero point measurement method of an electromagnetic flowmeter for supplying an excitation current to an exciting coil for giving a magnetic field to a measurement fluid, detecting an electric signal occurring in the measurement fluid according to the magnetic field, and computing a flow quantity value based on the electric signal, said zero point measurement method comprising the steps of:

measuring a zero point of the measurement fluid;
storing the measured zero point measurement value;
determining whether a difference between the stored preceding zero point measurement value and the stored present zero point measurement value is beyond a value range; and
transmitting or displaying the determination result when it is determined in said determining step that the difference is beyond the value range,
wherein when it is determined that the difference is beyond the value range, an output current, the excitation current, and an excitation method of said electromagnetic flowmeter are changed, and the zero point is then measured and the zero point measurement value is stored, and
wherein the excitation method is changed between (a) a three-valued excitation method based on three signal patterns and (b) a two-frequency excitation method at a high repetition frequency and a low repetition frequency or two-valued excitation method based on two signal patterns.

5. An electromagnetic flowmeter comprising:

an excitation circuit which supplies an excitation current to an exciting coil for giving a magnetic field to a measurement fluid;
a detecting section which detects an electric signal occurring in the measurement fluid according to the magnetic field;
a flow quantity computation section which calculates a flow quantity value based on the electric signal;
a zero point measurement section which measures a zero point of the measurement fluid;
a storage section which stores the measured zero point measurement value;
a determination section which determines whether the difference between a preceding zero point measurement value stored in said storage section and a present zero point measurement value stored in said storage section is beyond a value range; and
a zero point correction section which subtracts the zero point measurement value stored in the storage section from the flow quantity value calculated in the flow quantity computation section to calculate a flow quantity value subjected to zero point correction,
wherein when said determination section determines that the difference is within the value range, said zero point correction section subtracts the present zero point measurement value stored in said storage section from the flow quantity value computed in the flow quantity computation section, and
an output current, the excitation current, and an excitation method of said electromagnetic flowmeter are changed, and the zero point is then measured by said zero point measurement section and the zero point measurement value is stored in said storage section, and
wherein the excitation method is changed between (a) a three-valued excitation method based on three signal patterns and (b) a two-frequency excitation method at a high repetition frequency and a low repetition frequency or two-valued excitation method based on two signal patterns.

* * * * *